United States Patent [19]

Schnuepke et al.

[11] Patent Number: 5,662,540

[45] Date of Patent: Sep. 2, 1997

[54] TENSIONING DEVICE FOR A CHAIN OF AN INTERNAL COMBUSTION ENGINE

[75] Inventors: Hubert Schnuepke, Stuttgart; Albert Pietsch, Illingen, both of Germany

[73] Assignee: Mercedes-Benz AG, Stuttgart, Germany

[21] Appl. No.: 547,368

[22] Filed: Oct. 24, 1995

[30] Foreign Application Priority Data

Oct. 24, 1994 [DE] Germany .................. 44 37 926.9

[51] Int. Cl.$^6$ .................................................. F16H 7/08
[52] U.S. Cl. .................................... 474/111; 474/140
[58] Field of Search .......................... 474/101, 111, 474/140, 144

[56] References Cited

U.S. PATENT DOCUMENTS

| | | | |
|---|---|---|---|
| 3,148,555 | 9/1964 | Peras | 474/111 |
| 3,358,522 | 12/1967 | Poyser et al. | 474/111 |
| 4,395,250 | 7/1983 | King | 474/111 |
| 4,395,251 | 7/1983 | King et al. | 474/111 |
| 4,480,603 | 11/1984 | Tsuboi | 474/111 X |
| 4,741,299 | 5/1988 | Matsuura et al. | 474/111 X |
| 4,869,708 | 9/1989 | Hoffmann et al. | 474/140 |
| 5,033,421 | 7/1991 | Shimada et al. | 123/90.27 |
| 5,318,482 | 6/1994 | Sato et al. | 474/111 |
| 5,366,418 | 11/1994 | Fukushima et al. | 474/111 |

FOREIGN PATENT DOCUMENTS

| | | |
|---|---|---|
| 0 055 162 | 6/1982 | European Pat. Off. . |
| 1190167 | 10/1959 | France . |
| 1182009 | 11/1964 | Germany . |
| 1226850 | 10/1966 | Germany . |
| 41 36 033 | 5/1992 | Germany . |
| 2 143 926 | 2/1985 | United Kingdom . |

Primary Examiner—Roger J. Schoeppel
Attorney, Agent, or Firm—Evenson, McKeown, Edwards & Lenahan, P.L.L.C.

[57] ABSTRACT

In a device for tensioning a chain of an internal combustion engine, especially an oil-pump chain, with a tensioning arm preloaded by a spring device and supported in a point of support, the tensioning arm is supported at one of the support points of a chain guide. The chain guide guides a further chain, particularly the timing chain of the internal combustion engine.

15 Claims, 2 Drawing Sheets

TENSIONING DEVICE FOR A CHAIN OF AN INTERNAL COMBUSTION ENGINE

BACKGROUND AND SUMMARY OF THE INVENTION

The invention relates to a tensioning device for a chain of An internal combustion engine and, more particularly, to a tensioning device, especially for an oil-pump chain, having a tensioning arm preload by a spring device and mounted in a support point.

The tensioning arm of an oil-chain of an internal combustion engine is generally arranged on a pin which is mounted in the crank case of the internal combustion engine. A spiral spring normally serves to preload the tensioning arm. The tensioning arm is supported, for example, on a rib of the crank case of the engine.

An internal combustion engine generally has other chains or belts. Thus, for example, a timing chain for the internal combustion engine is guided by a chain guide. This chain guide generally has two points of support, which are likewise supported or mounted in the crank case by way of bearing pins.

In the case of previously known tensioning devices, separate points of support were provided for each part, e.g. the tensioning arm and chain guide or other chain-supporting parts. Examples of other tensioning devices are disclosed in German Patent document 1,182,009; 1,226,850; and 4,136,003, French Patent document 1,190,167 and European Patent document EP 00 55 162 B1.

There is therefore needed a device for tensioning a chain of an internal combustion engine and a mounting for the tensioning arm of a chain which is as simple as possible and is, in particular, especially suitable for series manufacture.

These needs are met according to the present invention by a device for tensioning a chain of an internal combustion engine, especially for an oil-pump chain, having a tensioning arm preloaded by a spring device and mounted in a support point. The tensioning arm is mounted on one of the support points of a chain guide through which at least one further chain is guided.

According to the present invention, a common mounting for the tensioning arm and the chain guide is provided for at least one point of support. This means that one point of support, and the associated outlay both in material and in assembly and/or disassembly, is eliminated. Also, at least one manufacturing process step is also eliminated by the present invention.

Prior to the present invention, the respective support points or bearing pins of the tensioning arm and the chain guide on the crank case were essentially too far apart. However, it was discovered here that, particularly in the case of relatively small engines, it is possible through the use of an appropriate lengthening of one of the two parts, namely the chain guide or the tensioning arm, or, alternatively, of both parts, to combine two bearing pins or to provide a common support at just one support point or on one bearing pin.

In general, the chain guide will be lengthened in an appropriate manner towards the tensioning arm but it would, in principle, also be possible to lengthen the tensioning arm in the same way. Owing to the higher loading and the weight of the tensioning arm and the associated loading of the spiral spring, however, it will generally be the chain guide which is lengthened in an appropriate manner. However, a compromise, i.e. bringing the two close together, is also possible.

A further significant advantage of the mounting according to the present invention is realized if the chain guide, the tensioning arm, and the spiral or leaf spring interacting therewith are designed as a preassembled unit. The preassembled unit is then pushed onto the bearing pin, which can be inserted into the crank case.

Other objects, advantages and novel features of the present invention will become apparent from the following detailed description of the invention when considered in conjunction with the accompanying drawings.

DETAILED DESCRIPTION OF THE DRAWINGS

Figure 1:
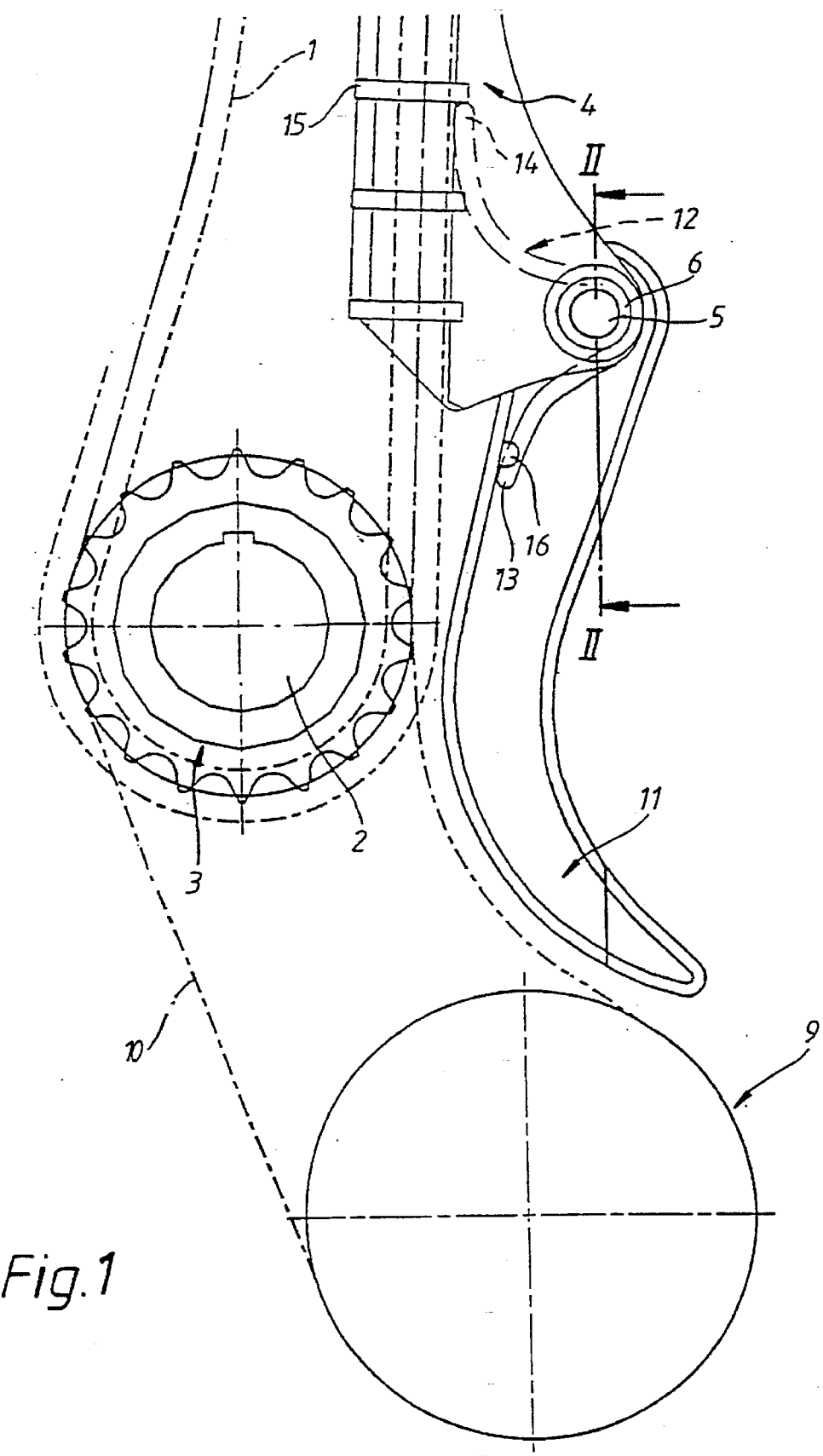
FIG. 1 is a side view of the tensioning device according to the present invention.
Figure 2:
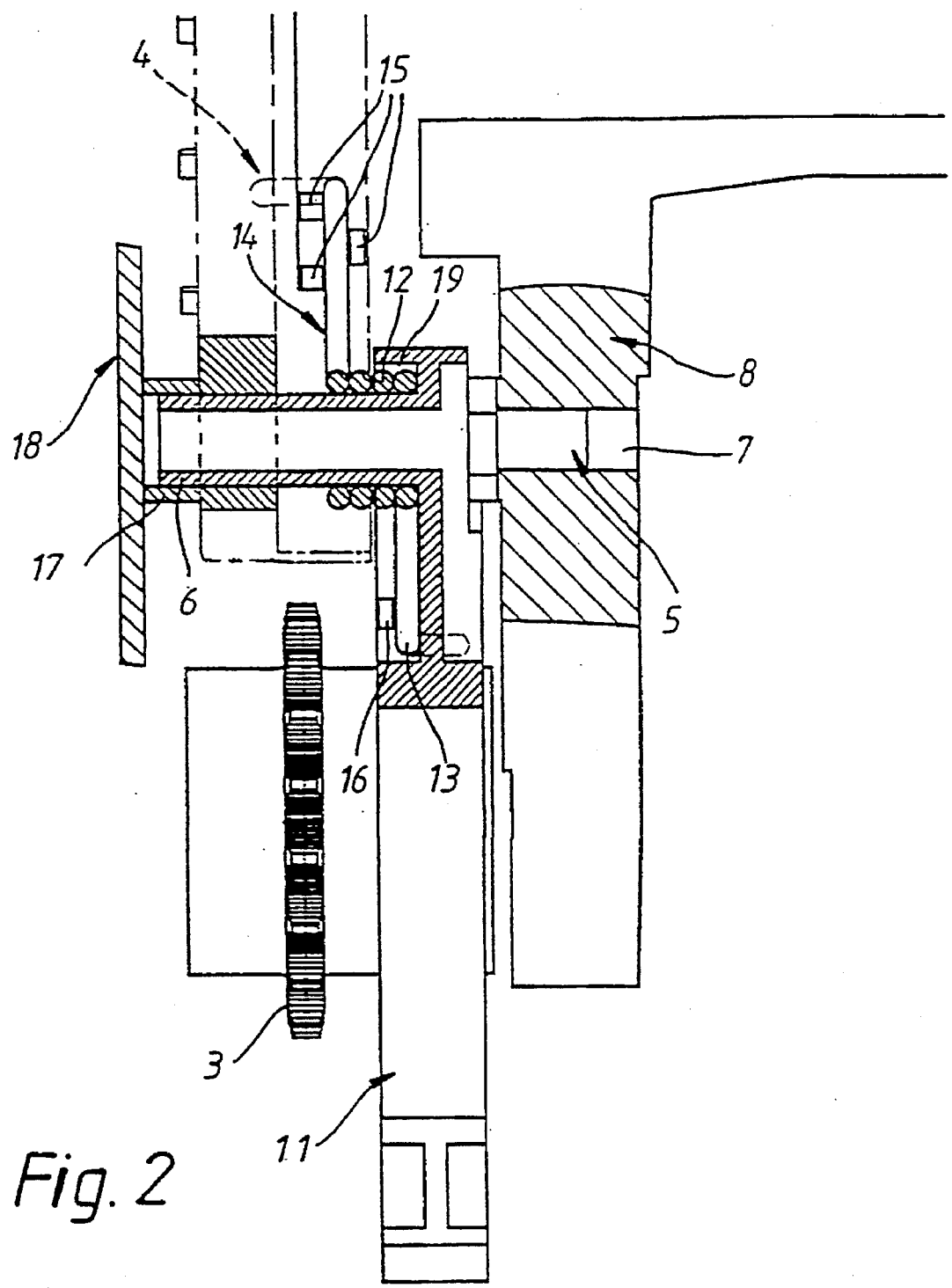
FIG. 2 is a section view taken along the line II—II in FIG. 1.

Referring to FIGS. 1 and 2, a timing chain 1 runs around in an endless manner between a sprocket 3 fixed to a crankshaft 2 and another sprocket, which is not shown. A chain guide 4 serves to guide the timing chain 1. In the region of its lower end, the chain guide 4 is mounted on a support point in the form of a bearing pin 5. The upper support point is not shown. A bearing sleeve 6 is arranged between the bearing pin 5 and the bearing eye of the chain guide 4. The bearing pin 5 is supported in a bearing hole 7 in the crank case 8 of the internal combustion engine.

An oil pump 9 is provided with an oil-pump chain 10, which is pretensioned by a tensioning arm 11. The pretensioning is provided by a spiral spring 12 which is supported by one end 13 on the tensioning arm 11 and by its other end 14 on the chain guide 4.

The tensioning arm 11 is slid onto the bearing pin 5 by way of its bearing sleeve 6 and lies between the chain guide 4 and the crank case 8.

As can be seen from FIG. 2, the bearing sleeve 6 has an annular recess 19 which serves to guide and support the spiral spring 12. As shown, the chain guide 4 and the tensioning arm 11 have the same support point, namely the bearing sleeve 6 and the bearing pin 5.

As is furthermore also shown in FIG. 2, the bearing sleeve 6 can be formed in one piece with the tensioning arm 11; i.e. the bearing sleeve 6 forms part of the tensioning arm 11. A further simplification or savings in parts is achieved by forming the bearing sleeve 6 in this manner.

The spiral spring 12 serves as a spring device. The spiral spring 12 is provided in the region of its support on the guide rail 4—as on the tensioning arm 11—with guide members to fix its position. The guide members can be of various designs. As illustrated, they can, for example, be in the form of ribs or dogs 15, the and 14 of the spiral spring 12 being held prestressed or clamped between dogs arranged a suitable distance apart. The other end 13 of the spiral spring, that is supported on the tensioning arm 11, can be clamped between a dog 16 and a wall of the tensioning arm.

It is also possible, if required, to use other types of spring devices to preload the tensioning arm 11 instead of the spiral spring 12. Other means of securing the position of the spiral spring 12 are, of course, likewise also possible within the scope of the invention. It is thus possible, for example, for one or both ends 13 and 14 to be angled transversely or at right angles to the longitudinal axis of the end or the two ends, thereby providing a wide and secure contact surface with the chain guide 4 and the tensioning arm 11. If required, the angled ends can be inserted into cutouts or holes in the chain guide 4 and the tensioning arm 11. Such a solution is indicated in broken lines in FIG. 2.

From FIG. 2, it can also be seen that preassembly of the support point according to the present invention is possible. For this purpose, all that is required is to slide the tensioning spring 12 and then the chain guide 4 onto the bearing sleeve 6. The bearing sleeve 6 is integrated into the tensioning arm 11. The chain guide 4 is provided with an outward-pointing collar 17, which serves as an abutment for a timing-case cover 18. As can be seen, the chain guide 4 is then supported on the tensioning arm 11 on one side and on the timing-case cover 18 on the other side once the preassembled unit comprising the tensioning arm 11, the spiral spring 12 and the chain guide 4 has been slid on. The chain guide 4 thus simultaneously holds the tensioning arm 11 in position as well.

The timing-case cover 18 is finally pushed on at the outside and thus limits the required axial play of the chain guide 4 and the tensioning arm 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A tensioning device for a chain of an internal combustion engine, having a crank case, comprising in combination:
   a chain guide for guiding at least one further chain of the internal combustion engine, said chain guide having a common support point;
   a tensioning arm mounted on said common support point of said chain guide; and
   a spring device for preloading said tensioning arm.

2. A device according to claim 1, wherein said chain is an oil-pump chain.

3. A device according to claim 1, wherein said at least one further chain is a timing chain, said timing chain being supported via said chain guide on said support point in the crank case of the internal combustion engine.

4. A device according to claim 1, further comprising a common bearing pin arranged at said support point for said tensioning arm and said chain guide.

5. A device according to claim 1, wherein said tensioning arm includes at least one portion which forms a bearing sleeve in one piece with said tensioning arm.

6. A device according to claim 1, wherein said spring device is one of a spiral and leaf spring supported on said chain guide by one end.

7. A device according to claim 6, wherein said chain guide includes guide members arranged in a support region for the ends of said spiral spring.

8. A device according to claim 7, wherein said guide members are formed as one of ribs and dogs arranged at a spaced apart distance and between which the end of said spiral spring lies.

9. A device according to claim 8, wherein the end of said spiral spring is mounted in a prestressed manner between said one of ribs and dogs.

10. A device according to claim 5, wherein said bearing sleeve formed in one piece with said tensioning arm also serves as a chain guide bearing sleeve; and further comprising
    a common bearing pin for both said tensioning arm and said chain guide, said common bearing pin being arranged in a hole of said bearing sleeve.

11. A device according to claim 1, wherein said chain guide, said spring device and said tensioning arm form a preassembled unit slidable onto a bearing pin, said bearing pin and preassembled unit being inserted into the crank case.

12. A method for assembling a tensioning device for a chain of an internal combustion engine having a crank case, the method comprising the steps of:
    preassembling a chain guide, a spring device, and a tensioning arm into a preassembled unit having a single common support point;
    sliding said preassembled unit onto a bearing pin; and
    inserting said bearing pin and preassembled unit into the crank case of the internal combustion engine.

13. A device according to claim 6, wherein said chain guide includes guide members arranged in a support region for the ends of said leaf spring.

14. A device according to claim 7, wherein said guide members are formed as one of ribs and dogs arranged at a spaced apart distance and between which the end of said leaf spring lies.

15. A device according to claim 14, wherein the end of said leaf spring is mounted in a prestressed manner between said one of ribs and dogs.

* * * * *